March 7, 1944.    O. T. FRANCIS    2,343,290
MEANS FOR SIGNALING WITH ELECTRONIC COMMUTATORS
Filed Oct. 23, 1941    5 Sheets-Sheet 1

Inventor
Oliver T. Francis

March 7, 1944. O. T. FRANCIS 2,343,290
MEANS FOR SIGNALING WITH ELECTRONIC COMMUTATORS
Filed Oct. 23, 1941 5 Sheets-Sheet 2

Inventor
Oliver T. Francis

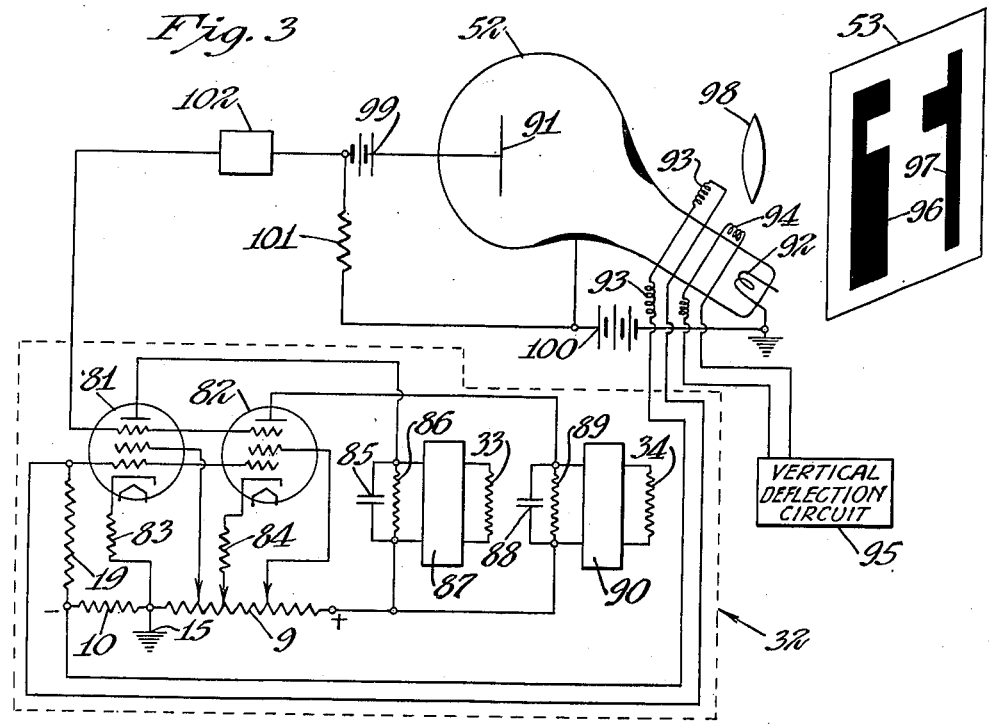
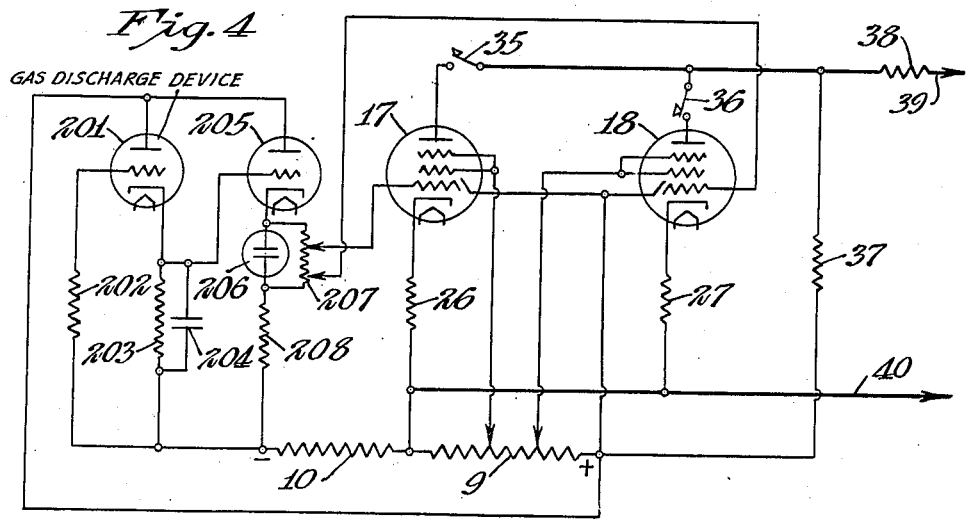

March 7, 1944.    O. T. FRANCIS    2,343,290
MEANS FOR SIGNALING WITH ELECTRONIC COMMUTATORS
Filed Oct. 23, 1941     5 Sheets-Sheet 5
*Fig. 6.*<sup>E</sup>
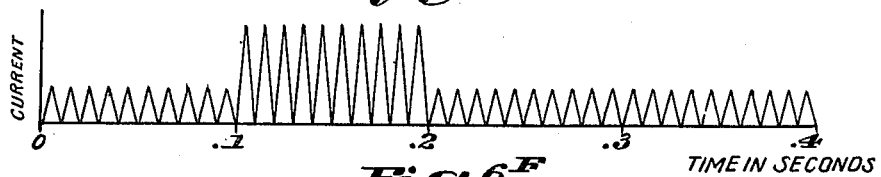
*Fig. 6.*<sup>F</sup>
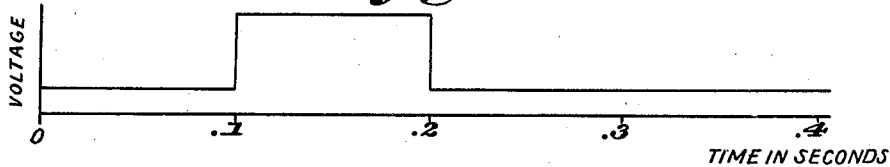
*Fig. 6.*<sup>A</sup>
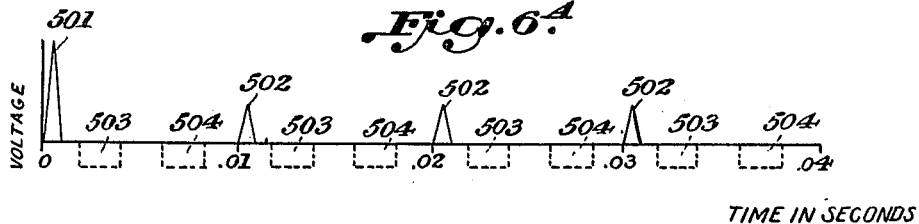
*Fig. 6.*<sup>B</sup>
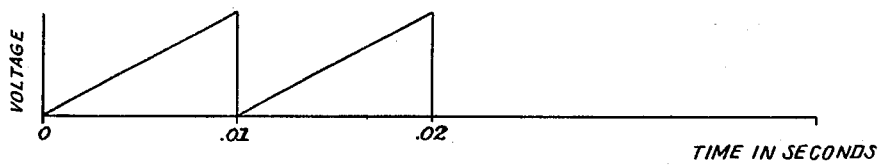
*Fig. 6.*<sup>C</sup>
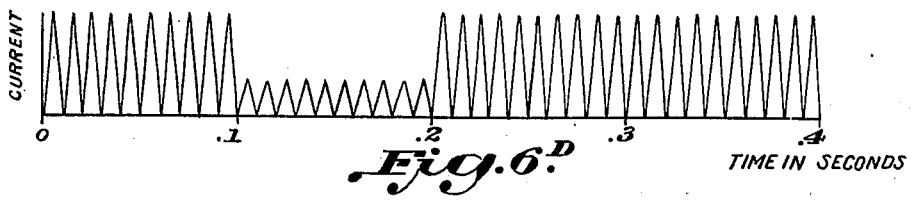
*Fig. 6.*<sup>D</sup>
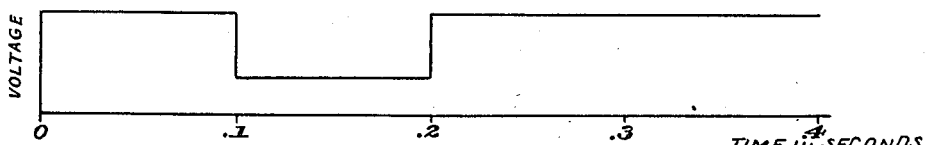
Inventor:
Oliver T. Francis Patented Mar. 7, 1944

2,343,290

UNITED STATES PATENT OFFICE 2,343,290

MEANS FOR SIGNALING WITH ELECTRONIC COMMUTATORS

Oliver T. Francis, Renville, Minn.

Application October 23, 1941, Serial No. 416,179

16 Claims. (Cl. 178—22)

This invention relates to multiplex signaling by electronic commutation, to means for rendering such systems secret, and more particularly to means for operating multiplex channeling systems from an alternating current source.

This invention is a continuation in part of U. S. Patent No. 2,254,279 issued to me September 2, 1941, entitled "Electronic commutator," of patent application Serial No. 331,644 entitled "Multiplex system" and of Ser. No. 397,301 entitled "Multiplex signaling system."

In the above inventions batteries were to a large extent used as a source of electromotive force. The source of biasing voltages were numerous. Attempts to supply these voltages by conventional rectifying systems from alternating current sources met with difficulties, due to the fact that biasing voltages were required at other than ground potentials and the transients introduced into the system rendered the system unstable. The methods for circumventing these difficulties were not entirely satisfactory, since even though the circuits were arranged so that the high voltages were generated at ground potential undesirable coupling between various portions of the circuit drawing current from the same source of supply introduced difficulties. Attempts to use photoelectric art for the application of the scanner voltages to the scanner grids 180 degrees out of phase necessitated the use of high resistances, where leakage resistance might become a deleterious factor, and limited frequency response, and required the use of gas discharge devices as voltage dropping resistances. While voltage regulating tubes of the gas discharge type have the important characteristic of an anode to cathode voltage drop independent of current flow, they are not entirely stable, as is well known, and there has been a trend in radio art to get away from the use of voltage regulators of the gas type where possible.

The use of synchronously moving secret tapes at transmitting stations such as illustrated in the above application entitled "Multiplex system," is accompanied with difficulties due to the necessity of maintaining accurate synchronism between mechanically moving tapes at the transmitting and receiving stations.

It is an object of this invention to illustrate means whereby the above difficulties may be overcome.

A resistance load common to the input and output circuit of a vacuum tube having a high mutual conductance, the output circuit of which is substantially free from impedance other than said common resistance, possesses certain important novel characteristics. The voltage drop across said resistance load is substantially independent of current drawn. In other words, variations in the impedance of said load resistance over wide values results in very little difference in voltage drop thereacross. The voltage drop across said load resistance is dependent almost entirely on voltages from independent sources impressed on the control electrode of said tube.

The well known triode gas relaxation oscillator tubes may give a satisfactory voltage swing for sequence operated devices, but the current through most of such tubes is limited to an average of a milliampere or two, and when power is drawn from such oscillators, their operation is not satisfactory.

It is an object of this invention to use a resistance common to the input and output circuit of a high transconductance vacuum tube (the grid of said tube being controlled by a relaxation oscillator), as a source of scanner voltage from which considerable power may be drawn. Another object of the invention is to illustrate how a resistance common to the input and output circuit of a high transconductance vacuum tube may be used as a constant source of biasing voltage for a sequence operated device.

Another object is to illustrate a novel pulse synchronizing voltage source comprising a vacuum tube having an input and an output circuit, a high resistance and a condenser connected in parallel in said input and output circuit, a load connected in said output circuit, and means for supplying voltages to the grid of said tube when a gas relaxation oscillator becomes conductive.

Another object is to illustrate a novel means whereby a vacuum tube having an anode, a cathode and a plurality of control electrodes, may be rendered conductive only to a predetermined magnitude of a varying voltage comprising a resistance common to the circuit of said anode and said control electrodes and means for applying said varying voltage to one of said control electrodes, to vary the voltage impressed on the other of said control electrodes.

Another object is to illustrate a novel means for applying a scanner voltage 180 degrees out of phase to a plurality of grids in the path of an electron stream.

Various methods of producing electrical currents corresponding in magnitude to light emitted from elemental areas of a scanned record without mechanically moving parts are known. In one of these methods the record is focused on a photoemissive mosaic in a cathode ray tube, and the mosaic scanned by a moving beam of electrons. In another method a bright spot is produced by a beam of electrons striking the screen of a cathode ray tube, together with means for scanning said screen with said beam and means for focusing light from said screen on a semi-transparent film, to produce scanning of said film. Another method of producing a scanning light source for scanning a record is illustrated in Fig. 2 of U. S. Patent No. 2,131,886 issued to me October 4, 1938, wherein cooling of an incandescent screen at all but one point is produced by the electrons evaporization effect. It is an object of this invention to provide a novel means for producing voltages for sequence shifting for secret sequence operated devices by synchronously scanning a secret record at a transmitting and receiving station, utilizing such scanning methods without mechanically moving parts. Another object is to illustrate a communication system rendered secret by electron scanning of secret records located at transmitting and receiving stations.

Another object is to provide means for indicating the magnitude of illumination of portions of a television pickup tube by one of the elements of an electron commutator.

Another object is to produce voltages in the elements of an electron commutator corresponding to a record without mechanical movement.

Other objects of the invention will become apparent from the following description and appended claims taken in connection with the accompanying drawings, wherein Fig. 1 is a diagrammatic illustration of a multiplex transmitter.

Fig. 3 shows in detail the channel shifting means shown diagrammatically in Figs. 1 and 2.

Fig. 4 shows a modification of the electronic commutator of Fig. 1.

Figs. 6A-F show currents and voltages existing in various portions of circuit plotted against time as abscissa.

In the figures similar numbers represent elements performing similar functions, in substantially the same manner.

Figure 1:
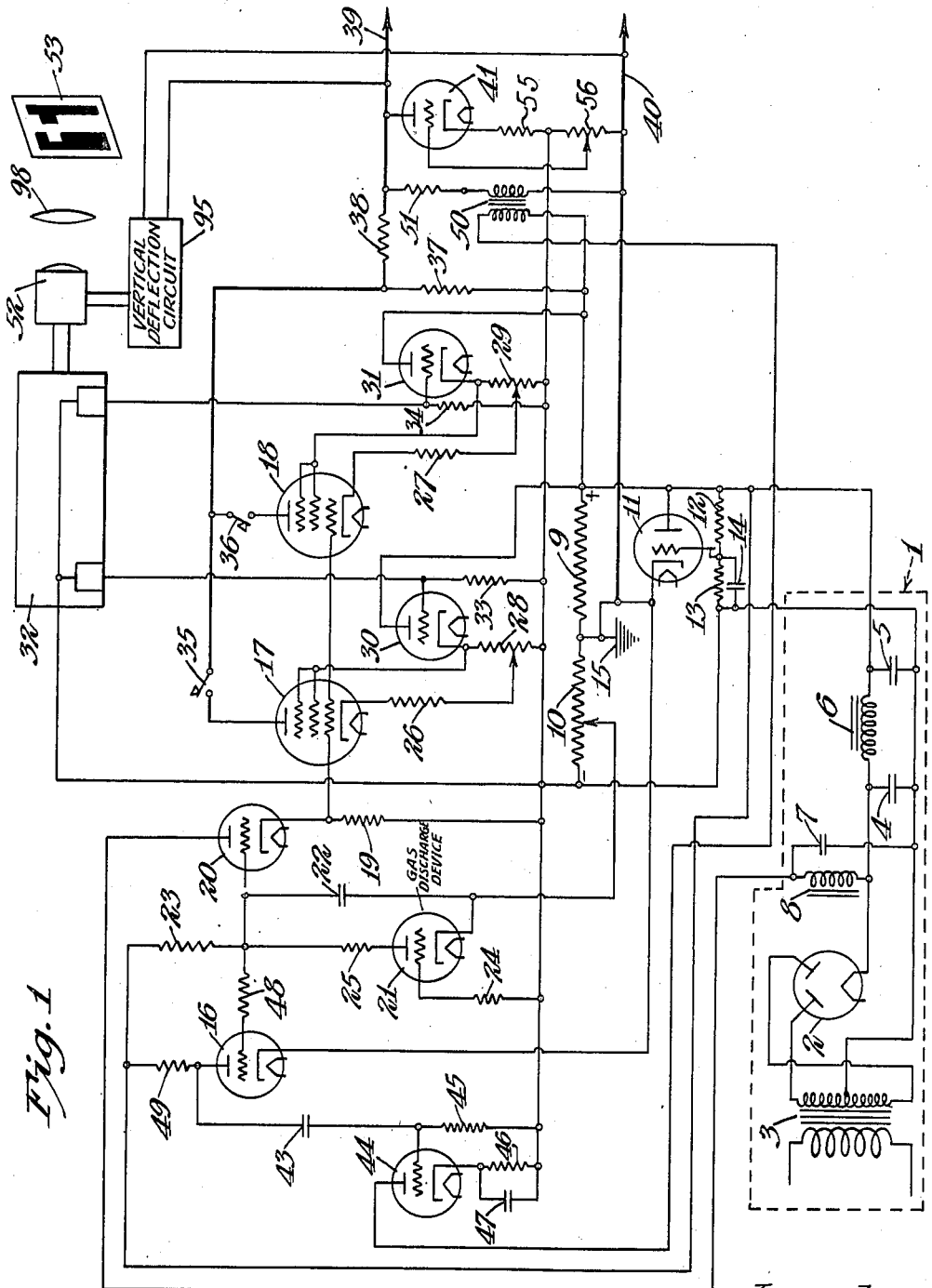

Referring to Fig. 1, 1 is the conventional rectifier circuit comprising rectifier tube supplied with high voltage from secondary of transformer 3, the primary of which may be connected to the 110 volt A. C. line. The usual filtering is accomplished by condensers 4 and 5, and choke 6. In order to prevent coupling with other parts of the circuit drawing considerable current a filtering system comprising choke 8 and condenser 7 has been provided.

High voltage from condenser 5 is supplied to resistances 9 and 10. Resistance 10 is connected in the input and output circuit of a high transconductance triode 11, having its anode connected to positive terminal of condenser 5, its cathode being connected to ground 15. A voltage divider consisting of high resistances 12 and 13, and a condenser 14 being connected in parallel with resistance 13, tends to place a positive potential on the control electrode of triode 11 and are chosen of such values as to permit a space current of considerable magnitude to flow through resistance 10, which resistance being common to the input circuit of triode 11 tends to place a negative potential on the control electrode of triode 11. As previously indicated considerable variations in current may flow between positive terminal of condenser 5 by auxiliary circuits to ground 15 and negative terminal of condenser 5 without appreciably effecting the voltage drop across resistance 10. For example, if the conductivity of tube 16 were to be increased by placing a positive potential on its grid so that it would conduct one milliampere, assuming triode 11 to have a transconductance of 5000 microhms the voltage across resistance 10 would increase less than a fifth of a volt since the added negative potential impressed on grid of 11 would decrease the space current flowing through 11 correspondingly.

The sequence operated vacuum tubes 17 and 18 operate on the differential grid action principle described in my patent and patent applications above referred to. The grids nearest the cathodes in each of these tubes are connected together to a source of scanner voltage across resistance 19. Resistance 19 is connected in the input and output circuit of high transconductance triode 20, the anode of which is connected directly to positive terminal of condenser 7. As considerable space current flows through triode 20 during certain portions of the scanner voltage swing, especially if several sequence operated tubes such as 17 and 18 are incorporated in the circuit, I have found it desirable to connect it to the rectifier circuit 1 through a separate filter circuit comprising condenser 7 and choke 8.

The function of high vacuum triode 20 is that of a current amplifier, that is a power amplifier. Oscillators of the gas discharge device type such as device 21, can be made to produce large voltage swings. The maximum average current flow through a device such as 21 may be only two milliamperes, and a device such as 21 does not function well when even a small amount of power is drawn from it. Since triode 20 has a high transconductance the voltage across resistance 19 is dependent on the voltage impressed on its grid by the anode of device 21 and is not materially effected by comparatively large amounts of current drawn from the cathode of tube 20, to inner grids of vacuum tubes 17, 18, and television pickup tube 52, as will be described in discussion of Fig. 3. Some of the advantages of a current amplifier connected as triode 20 are that it is lineal in its amplification characteristics, and requires no negative "C" bias battery since the necessary bias is furnished by the voltage drop across resistance 19. The phase of the amplified current is not reversed as in the conventional triode amplifier, but is of the same phase as the voltage applied to its grid. All of these factors are of major importance in scanner voltage sources for electronic commutators. Large variations in space current passing through triode 20, resistance 19 do not therefore produce undesired fluctuations in other portions of the circuit, as would be the case with conventional amplifiers having a common "C" biasing source.

The grid of triode 20 is connected to the anode of three electrode gas discharge device 21, the grid of which device is connected through resistance 24 to the negative terminal of resistance 10, the cathode of which is connected to a point more positive on 10 to place the desired negative potential on grid of device 21. Condenser 22 is connected across the anode and cathode of device 21, a small current limiting resistance 25 being connected to its anode as is usual practice in gas relaxation oscillators of this type. The anode of device 21 is connected to the positive terminal of condenser 5 through high resistance 23.

Resistance 26 has been placed in the input and output circuit of tube 17, and is connected to resistance 28 at a point slightly more negative than the two grids closest the anode of 17 are connected. Similarly resistance 27 is connected in the input and output circuit of tube 18 to a point on resistance 29 slightly more negative than the two grids closest to the anode of tube 18 are connected.

Resistances 28 and 29 are connected in the respective input and output circuits of high transconductance triodes 30 and 31. The potentials on the grids of these latter triodes determine the sequence of operability of tubes 17 and 18 and these potentials are in turn controlled by a novel secret channel shifting device 32, 52, 53, later to be described, for rendering my electron commutation signaling system secret. The anodes of triodes 30 and 31 are connected to the positive terminal of condenser 5. The potential drop across resistance 28 and 29 is therefore substantially independent of space current flowing through tubes 17 and 18, but depends on the grid potentials impressed across resistances 33 and 34 from channel shifting device 32, 52, 53.

In the output circuits of tubes 17 and 18 are connected their respective keys 35 and 36, and resistance 37 to positive terminal of condenser 5. The voltage variations across resistance 37 are transmitted to outgoing lines 39 and 40 through voltage dropping resistance 38, vacuum tube choke 41, being connected across the lines as a high A. C. impedance as described in my above referred to U. S. Patent No. 2,300,664 issued Nov. 3, 1942. The cathode of tube 41 is connected through resistance 55 to the negative terminal of power supply 1. The grid of tube 41 is connected to resistance 56 at a point more positive than negative of power supply 1. As is well known a vacuum tube such as 41, having a resistance such as 55 connected in its input and output circuit has a very high impedance to alternating current. The direct current impedance of tube 41 is dependent on the positive potential impressed on its grid to overcome the effect of the D. C. voltage drop across resistance 55. Resistance 38 and vacuum tube 41 therefore constitute a voltage divider. The A. C. component of the voltage drop across resistance 37 is passed through resistance 38 to line 39 and is prevented from being bypassed to negative of power supply 1 by the high A. C. impedance of tube 41. The D. C. potential of line 39 may be adjusted by varying the point where the grid of tube 41 connects to resistance 56 in order to place a positive potential on the grid of vacuum tube 60 at the receiving station, Fig. 2, except when the grid of tube 60 is thrown negative by signal pulses.

The synchronizing pulse generator system comprises vacuum tube 16 having its grid connected through a high resistance 48 to the anode of gas discharge device 21. Its anode is connected to the positive terminal of condenser 5 through a load resistance 49, and its cathode connected to ground to place a negative potential on its grid except when condenser 22 is fully charged. The anode of tube 16 is connected through a small condenser 43 to the grid of vacuum tube 44. Resistance 45 may be of the order of a megohm and connects the grid of tube 44 to the negative terminal of resistance 10. Resistance 46 in parallel with condenser 47 is connected in the input and output circuit of tube 44, this resistance being of such a large value as to permit substantially no continuous space current to flow through tube 44. In the output circuit of tube 44 is connected primary of transformer 50, the secondary of which is connected across lines 39 and 40 through resistances 51, which may be of the order of two megohms.

Figure 2:
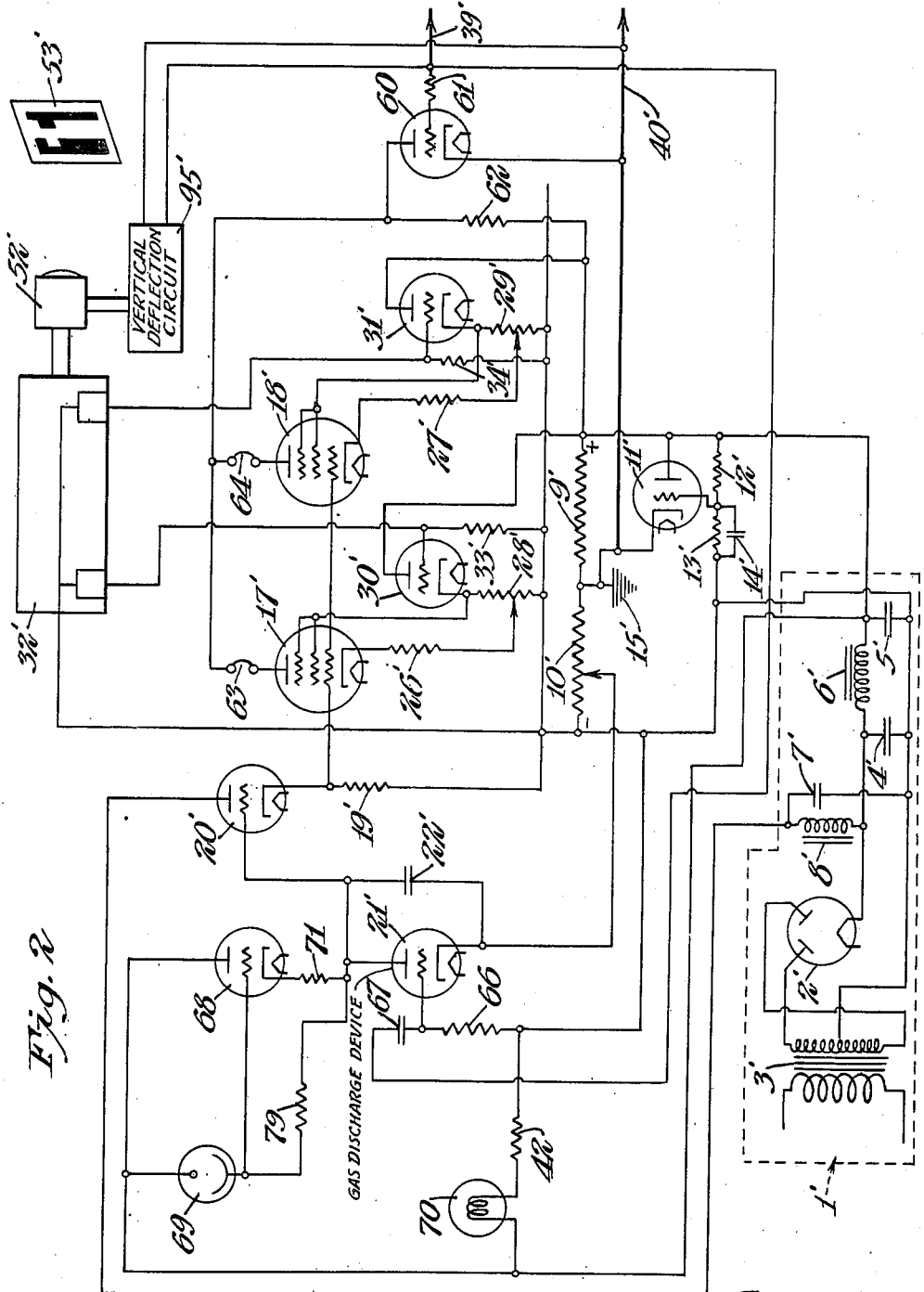
Fig. 2 is a diagrammatic illustration of the receiver.

Fig. 2 shows the receiving station for receiving signals sent out by transmitting station Fig. 1. As the functioning of most portions of the circuit of Fig. 2 are identical with those of the transmitter Fig. 1, components performing identical functions have been assigned the same numbers, with the prime character added.

Referring to Fig. 2, the source of high voltage supply 1' is identical with that of the transmitter consisting of a rectifier 2', power transformer 3', filter condensers 4', 5', 7', chokes 6', 8', voltage divider resistance 9' and 10', vacuum tube regulator 11', controlled by resistances 12', 13', and condenser 14'. Sequence operated vacuum tubes 17', and 18' function in substantially the same way as corresponding tubes at the transmitting station above described. The grids closest to the cathodes are connected to scanner voltage source comprising resistance 19' in the input and output circuit of high transconductance triode 20'. The anode of triode 20' is connected to the positive terminal of condenser 7'. The grid of 20' is connected to anode of gas discharge device 21', condenser 22' being placed across this device. The grid of device 21' is connected to negative terminal of resistance 10' through resistance 66 and to line 39' through condenser 67. The cathode of device 21' is connected to resistance 10' at a point more positive than the grid of device 21' to place a high negative potential on said grid to render device 21' nonconductive except when it receives a strong pulse from line 39' through condenser 67.

The load in the output circuit of device 21' consists of high amplification factor triode 68, the anode of which is connected to the positive terminal of condenser 5', resistance 71 being connected in the common input and output circuit thereof. The grid of triode 68 is connected to anode of device 21' through a high resistance 79, and to positive voltage terminal of condenser 5' through high vacuum photoelectric cell 69. This cell is illuminated by a constant source of light 70, the incandescent filament of which is connected in series with resistance 42 across condenser 5'. Since photoelectric cell 69 operates at saturation, it tends to place a constant positive potential on grid of triode 68 to neutralize the effects of the otherwise excessive negative potential impressed thereon by resistance 71. Photoelectric cell 69 in combination with vacuum tube 68 therefore draws off from the upper plate of condenser 22' a substantially constant electron current independent of voltage changes across condenser 22'.

The grid of vacuum tube 60 is connected to incoming line 39' through high resistance 61, the purpose of this latter resistance being to prevent high voltage pulses applied to grid of device 21' through condenser 67 from being shortcircuited to ground by the grid filament path of tube 60. The anode of tube 60 is connected through load resistance 62 to positive terminal of condenser 5'. Resistance 62 is also common to the output circuit of sequence operated tubes 17', 18' to permit current to flow through indicating devices 63, 64, here shown as headphones, only when corresponding tubes are conductive at the transmitting station. The cathodes of tubes 17', 18' are connected through respective resistances 26', 27' to points of different potential across condenser 5' by voltage dividers consisting of resistance 28', tube 30', and resistance 29', tube 31'. The potential of grids of tubes 30'' and 31' are controlled by secret channel shifting device 32' controlled by cathode ray pickup tube 52', scanning secret record 53', in synchronism with corresponding elements at the transmitting station as will hereinafter be explained.

In operation, when device 21 of Fig. 1 breaks down discharging condenser 22, the grid of tube 16 is thrown negative, causing a high positive pulse of short duration to pass through condenser 43 rendering tube 44 highly conductive for a brief instant, causing high positive pulse from secondary of transformer 50 to be sent over line 39 to line 39' at receiving station of Fig. 2. This pulse is blocked by resistance 61, and passes through condenser 67 to produce a high positive potential on grid of gas device 21' of Fig. 2, and discharges condenser 22', and thereby produces corresponding scanner voltages across resistance 19 of Fig. 1 and resistance 19' of Fig. 2. If key 35 at transmitting station is closed a current will flow through resistance 37 of Fig. 1, producing a negative pulse through resistance 38 and line 39 to line 39' at the receiving station, where it causes the grid of tube 60 to assume a negative potential, blocking current from flowing through resistance 62, to tube 60, and permitting current to flow through indicating device 63, and sequence operated tube 17' of Fig. 2. If device 21 at transmitting station breaks down at 100 times per second, a hundred cycle note will then be heard in device 63, here shown as headphones.

The synchronously secret channel shifting apparatus at the transmitting and receiving stations consists of substantially identical equipment, and is illustrated in Fig. 3. Referring to Fig. 3, channel shifting device 32 consists of an electronic commutator, consisting of sequence operated tubes 81, 82 having grids closest their cathodes connected across scanner voltage source comprising resistance 19, at transmitting station or 19' at receiving station. The cathodes of tubes 81, 82 are connected through resistances 83, 84, respectively to resistance 9 at various potential points. Similarly the other scanner grids of tubes 81, 82 are respectively connected to different points on resistance 9 to render tubes 81, 82 sequentially operable as scanner voltage across resistance 19 or 19' varies.

The third grids of tubes 81, 82 are controlled by conventional television pick up tube 52 having a mosaic plate 91, electron gun 92, horizontal deflecting coils 93, which may be energized by scanning voltage across resistance 19 or 19', vertical deflecting coils 94, which are energized by a vertical deflecting circuit 95 or 95' of conventional design. Light from secret record 53 with black lines 96, 97 thereon is focused on plate 91 by lens 98. Television pick up tube 52 is supplied by conventional anode batteries 99, 100, through load resistance 101, amplifier 102 renders third grids of tubes 81, 82 negative except when the darkened portions 96, 97 of secret record 53 focused on plate 91 are being scanned by electron beam from electron gun 92. When however, line 96 is being scanned a positive potential is impressed on third grids of tubes 81, 82. During the period of time that line 96 is being scanned, the scanner voltage across resistance 19, is such as to permit a current to flow through resistance 86 and anode to cathode of tube 81, the magnitude of which will depend depend on the width of line 96. This current is smoothed out by condenser 85, amplified by amplifier 87 and applied through resistance 33 to grid of tube 30 of Fig. 1 to determine the instant of operability of tube 17 at transmitting station of Fig. 1. Similarly electron commutator 32' at receiving station renders tube 17' simultaneously operable at the receiving station.

Similarly tube 82 is rendered conductive during the period of time that line 97 is being scanned by the horizontal sweep voltage from resistance 19, and the current in the output circuit of tube 82 passes through resistance 89, is smoothed out by condenser 88 and amplified by amplifier 90 and is supplied to resistance 34 to determine the instant of operability of tube 18 at the transmitting station, illustrated in Fig. 1.

The vertical deflection circuit is of conventional design, and is chosen of as low a frequency as practicable. At the transmitting station vertical deflection pulses are supplied to lines 39, 40 by vertical deflection circuit 95. At the receiving station of Fig. 2 these vertical deflection pulses are picked up from lines 39', 40', amplified by vertical deflection circuit 95' and utilized to maintain synchronous scanning of the secret record 53' located at the receiving station with the scanning of the secret record 53 located at the transmitting station.

The functioning of Figs. 1, 2, and 3 is further clarified by assuming a specific example with the aid of graphs showing voltages existent in all principal circuits against time as an abscissa.

Assume that the horizontal deflection voltage is 100 cycles per second, that the vertical deflection voltage is one cycle per second, that the values of resistances 86, 89 are 100,000 ohms each. The values of condensers 85, 88 may be of the order of .2 micro-farad. Resistance 86, condenser 85 then have an RC time element of .02 of a second. Condenser 85 has a comparatively low impedance to 100 cycle current.

Fig. 6A shows the voltage impressed on lines 39, 40 over a period of .04 second. It comprises a very high voltage vertical synchronizing pulse 501 repeated each second; a lower horizontal synchronizing pulse 502 repeated each hundredth of a second, and signal pulses 503, 504 of lower magnitude and negative polarity.

Fig. 6B shows the horizontal scanner voltage variations across resistance 19, which is applied to the inner grids of vacuum tubes 17, 18, 81, 82 and to the horizontal sweep circuit of television pickup tube 52. It will be noted that one cycle of this horizontal sweep voltage is .01 second in duration.

Fig. 6C shows the current flowing through vacuum tube 81. There are ten pulses each tenth of a second. During the first tenth of a second shown in Fig. 6C, the upper tenth of black line 96 of Fig. 3 is horizontally scanned ten times. The pulses are much higher and broader than during the second tenth of a second when the narrow portion of line 96 is being scanned horizontally ten times. During the remaining 8 tenths of a second while the bottom broad portion of line 96, is being horizontally scanned, the pulses are high and broad. Only .4 of a second are shown in Fig. 6C but as previously stated the entire vertical sweep takes one second.

The pulses during the first and second tenths of a second are of different magnitude as shown in Fig. 6C, and consequently produce different voltage charges on condenser 85. These differences in voltage charges on condenser 85 are amplified by amplifier 87 and produce voltages across resistance 33 as shown in Fig. 6D. The first tenth of a second the voltage across resistance 33 is high. The second tenth, it is low. The remaining portion of the second it is high.

Fig. 6E shows the current flowing in vacuum tube 82. During the first tenth of a second the upper portion of line 97 is horizontally scanned ten times. As shown in Fig. 6E these pulses are small. During the second tenth of a second the pulses are higher and broader and during the remaining portion of the vertical sweep the pulses are again narrow and low.

Fig. 6F shows voltage variations across resistance 34 after these pulses have been smoothed out by condenser 88 and amplified by amplifier 90.

Due to the fact that the horizontal sweep circuit source of television pick up tube 52 and the scanner voltage source of tubes 81, 82 are both resistance 19, it is easy to synchronize the electronic commutator 32 with tube 52, so that tube 81 is only rendered conductive by the black portion of line 96, while tube 82 is only rendered conductive by the black portions of line 97. Variable connections on resistance 9 are illustrated for this purpose.

It will be noted that Fig. 6F is the reverse of Fig. 6D. During the first tenth of a second when the voltage across resistance 33' is large headphones 63 are actuated by a signal pulse 504 of Fig. 6A. During the second tenth of a second, when the voltage across resistance 33' is small, headphones 63 are actuated by pulses immediately following the horizontal synchronizing pulse 502, that is by pulses in the time position of 503 of Fig. 6A.

Similarly during the first tenth of a second when the voltage across resistance 34' is small headphones 64 are actuated by pulses immediately following horizontal synchronizing pulses. While in the second tenth of a second with the voltage across resistance 34' large, headphones 64 are actuated by pulses occurring a longer time after the horizontal synchronizing pulses, that is by pulses 504.

Similar secret elements (or records) at transmitting and receiving stations have been used for maintaining secret communication. As far as I am aware these elements require synchronously mechanically moving parts. The difficulties of maintaining mechanical synchronization at remote stations is well known to experimenters in the mechanically synchronized television of fifteen years ago. I have disclosed above a method of maintaining secrecy by electronic scanning of a plurality of secret records located at remote stations, thereby eliminating the difficulties of mechanical synchronism.

Fig. 4 illustrates a modification of the electronic commutator shown in Fig. 1. Tubes 17 and 18 of Fig. 4 each have an additional anode connected in parallel to positive terminal of resistance 9. The scanner voltage source comprises triode gas discharge device 201 having a resistance 203 in parallel with condenser 204 in its input and output circuit. The anode of device 201 is connected directly to the positive terminal of resistance 9, its grid being connected to the negative terminal of resistance 10 through resistance 202. The cathode of device 201 is connected to the control grid of high transconductance triode 205, the anode of triode 205 being connected directly to positive terminal of resistance 9. In the input and output circuit of triode 205 is connected voltage regulator tube 206 in the form of a gas discharge diode, in parallel with potentiometer 207 and in series with resistance 208 to negative terminal of resistance 10. The grids nearest the cathodes of tubes 17 and 18 have been connected to potentiometer 207 at electrically remote points. The other grids of tubes 17 and 18 have been connected to voltage divider 9 to render tubes 17 and 18 sequentially operable as follows: Device 201 breaks down charging condenser 204 to a high value, thereby producing a high voltage drop across resistance 208. The grids closest to the cathodes of both tubes 17 and 18 become positive. Sufficient current then flows from the grid and anode nearest the cathode of tube 17 through resistance 26 to render tube 17 non-conductive to space current flowing through closed key 35. Tube 18 is, however, conductive to current flowing through closed key 36 since the inner grid of 18 is not thrown as far positive as tube 17 and the outer grids of tube 18 are still at a positive potential. As condenser 204 discharges and voltage across resistance 208 decreases, the grid of tube 18 connected to potentiometer 207 becomes negative, blocking space current from closed key 36. The inner grid of tube 17 connected to potentiometer 207 becomes less positive, and the IR drop across resistance 26 decreases and space current flows through closed key 35.

The function of gas discharge device 201 is the same as device 21 of Fig. 1, that is to produce voltage swings of the grid of current amplifier tube 205. It will be noted that while the triode gas discharge device 21 of Fig. 1 has its load connected in its output circuit in the form of resistance 23, the device 201 of Fig. 4 has its load connected in its input and output circuit in the form of resistance 203. A gas discharge device oscillator connected as device 201 of Fig. 4, has the advantage of requiring no battery as a negative biasing source for its grid, since this negative bias is furnished by the voltage drop across resistance 203 in parallel with condenser 204 connected in the input and output circuit of device 201. The disadvantage of a gas discharge device oscillator connected as device 201 of Fig. 4 is that variations in power supply voltage will effect the maximum voltage to which condenser 204 will charge when device 201 becomes conductive.

I have found the circuit illustrated in Fig. 4, to give excellent operating results for four sequence operated tubes such as 17 and 18. However it utilizes a gas regulator tube 206, and the use of gas voltage regulator tubes is not conducive to stability, especially at the higher frequencies.

Figure 5:
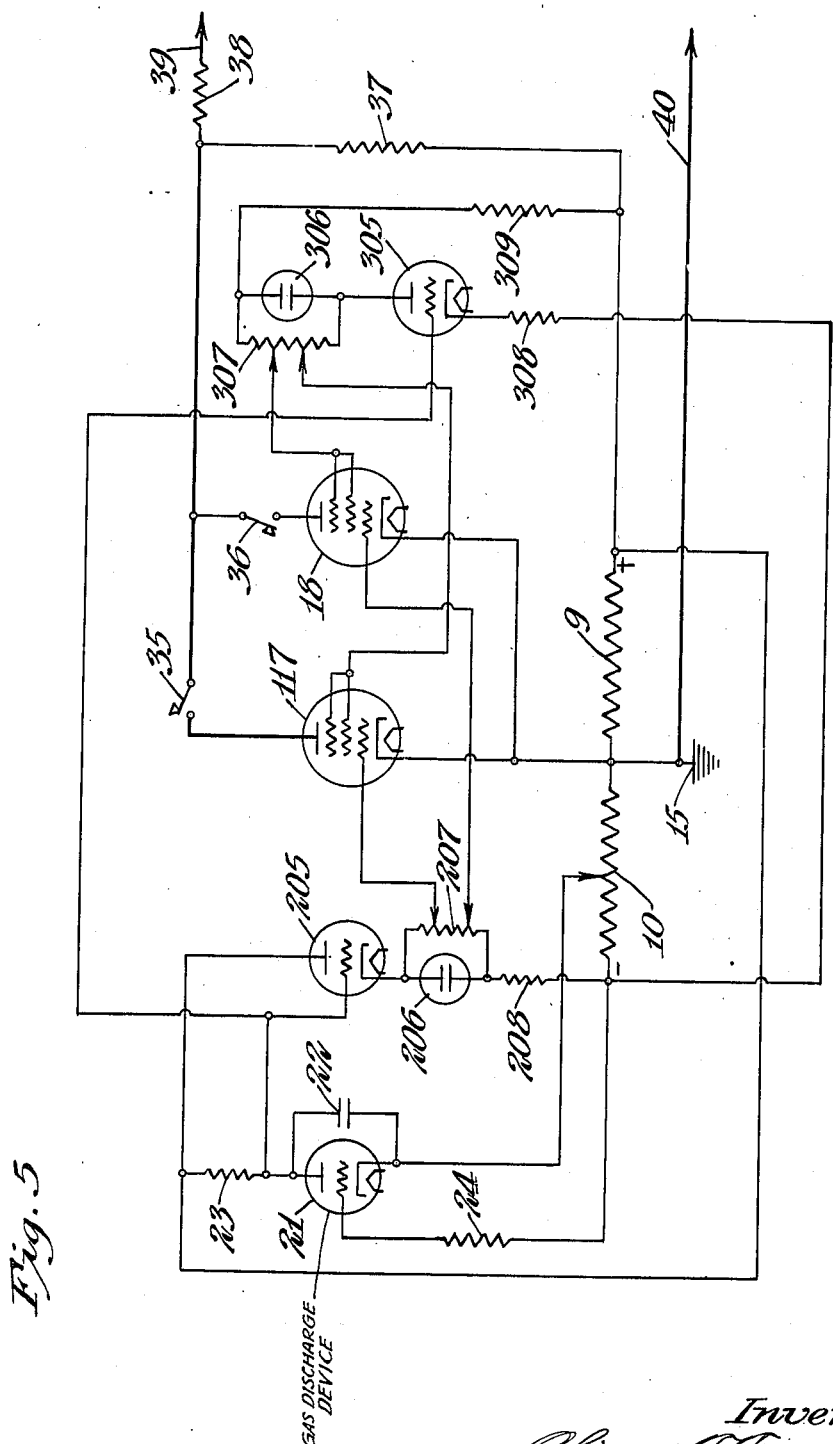
Fig. 5 shows a further modification of the commutator shown in Fig. 1.

Fig. 5 illustrates a further modification of the electronic commutator illustrated in Fig. 1. In Fig. 5 the differentially varying scanner voltage for producing scanner voltages for the grids of sequence operated vacuum tubes 17, 18 comprise high transconductance triodes 205, and 305, together with their associated circuits. In Fig. 5, gas discharge device 21 is connected substantially as described in Fig. 1, its anode being connected to the positive terminal of resistance 9 through load resistance 23, its cathode being connected to a positive point on resistance 10, its grid being connected to the negative terminal of resistance 10 through resistance 24, condenser 22 being in parallel with device 21. Tube 205 is connected substantially as described in Fig. 4. Its anode is connected to the positive terminal of resistance 9. Gas voltage regulator tube 206, in parallel with potentiometer 207 in series with resistance 208 is connected in the input and output circuit of high transconductance triode 205. High transconductance tube 305 has biasing resistance 308 connected in its input and output circuit. Gas voltage regulator tube 306 in parallel with potentiometer 307, in series with load resistance 309 is connected in its output circuit. The grid of triode 305 is connected to the anode of device 21. The scanner grids of tubes 17 and 18 are connected to potentiometers 207, 307 to differentially apply a scanner voltage to them and thereby render tubes 17 and 18 sequentially operable as described in my above referred to patent. The electronic commutator of Fig. 5 has been found to operate satisfactorily but it has disadvantages over the electronic commutator of Fig. 1 in that two gas regulator tubes 206, 306 are required. Furthermore the voltage supply across resistances 9 and 10 had to be maintained at a much higher value than for Fig. 1, if a large number of sequence operated tubes 17, 18 were incorporated in the circuit. This was due to the fact that if commutator grid of tube 18 connected to the upper part of potentiometer 307 is to assume a negative blocking potential with respect to cathode of tube 18 which is connected to ground, the combined voltage drop across resistance 308, triode 305, and gas regulator tube 306 must be less than the voltage drop across resistance 10.

With indirectly heated cathodes such as I have illustrated, I have found it possible to operate the heaters for the various tubes illustrated in the electron commutator portion of my device with a single filament transformer, an exception being made in the case of the gas triode relaxation oscillator.

Numerous deviations and variations in combinations from those illustrated will be obvious to persons skilled in electronic and television art. It is therefore not desired to limit the invention to the forms above disclosed. My invention is to be limited only as defined in the following claims.

What I claim is:

1. The method of synchronously shifting the sequence of operability of transmitting and receiving devices in accordance with a secret record focused on a mosaic electrode upon which electrostatic charges are adapted to accumulate, located at signal transmitting and receiving stations which consists in synchronously scanning said mosaic electrode at each of said stations to produce a current varying with said electrostatic charges, and in producing identical changes in the sequence of operability of said transmitting and receiving devices with said current.

2. In a signaling system, a transmitting station, a receiving station, cyclically operable units at each of said stations, means for synchronizing said units at said transmitting and receiving stations, means for varying the sequence of operability of said units at both of said stations to a new sequence, said last means comprising similar records at each of said stations, means for synchronously scanning said records to produce electrical currents corresponding in magnitude to light emitted by elemental areas of said records being scanned, said scanning means involving no mechanically moving parts, and means for varying said sequence by said electrical currents.

3. In a signaling system, a transmitting station, a receiving station, an electronic commutator at each of said stations, each of said commutators comprising a plurality of commutator unit vacuum tubes, means for synchronizing said commutators to render corresponding vacuum tubes operable simultaneously, means for changing the sequence of operation of said vacuum tubes to a new sequence, said last means comprising a record, a mosaic electrode upon which electrostatic charges are adapted to accumulate located at each of said stations, means for focusing said record on said electrode at each of said stations, means for synchronously scanning said electrode, at each of said stations, to produce similar electrical currents at each of said stations, and means for controlling said sequence with said currents.

4. In a signaling system, the method of synchronously and similarly shifting the sequence of operability of sequence operated devices at transmitting and receiving stations, which consists in scanning simultaneously and synchronously a mosaic electrode upon which electrostatic charges are adapted to accumulate at each of said stations, in illuminating said electrodes at each of said stations with similar optical images, in producing from said scanning corresponding electrical currents at each of said stations, and in controlling said sequence of operability at each of said stations with said currents.

5. The combination with a plurality of electronic commutators, each of said commutators comprising a plurality of commutator unit vacuum tubes each of said vacuum tubes having an anode, a cathode, and a plurality of grids, a resistance connected in the common circuits of said anode and said grids, a source of voltage connected in the circuit of said anode, means for maintaining synchronism between said commutators, said means comprising means for producing a synchronizing current, means for applying said current to one of said grids of each of said tubes, to tend to produce a positive potential on said one of said grids, and means for connecting a second of said grids and said resistance connected in the common circuit of said anode and said grids of each of said vacuum tubes to points of predetermined different potential on said source of voltage to render corresponding unit vacuum tubes of said commutators conductive simultaneously.

6. In a multiplex signaling system, a transmitting station, a receiving station, an electronic commutator at each of said stations, a pair of lines connecting said stations, said commutator comprising unit vacuum tubes, a source of varying voltage, means for rendering each of said tubes operable at different predetermined magnitudes of said voltage, means for producing pulses at said transmitting station to maintain said varying voltage at said receiving station in synchronism with said varying voltage at said transmitting station, said means for producing pulses comprising a thermionic tube having an input and an output circuit, a resistance shunted by a condenser connected in said input and said output circuit, said resistance being of such large magnitude as to permit substantially no continuous current to flow in said output circuit, the primary of a transformer connected in said output circuit, means for connecting the secondary of said transformer across said pair of lines, and means for applying positive voltage surges from said source of varying voltage at said transmitting station to said input circuit to produce pulses of current in said output circuit.

7. In a signaling system, a transmitting station, a receiving station, an electronic commutator at each of said stations, each of said commutators comprising a plurality of unit vacuum tubes, each of tubes having an anode, a cathode, and a plurality of grids, a resistance connected in the common circuit of said anode and said grids, a source of anode current connected in the circuit of said anode, a source of scanner voltage, means for applying said voltage to a first of the grids in each of said tubes to tend to place a positive potential on said first grid, means for connecting a second grid of each of said tubes, and said resistance connected in said common circuit of each of said tubes, to points of predetermined potential on said source of anode current to render corresponding tubes of said commutators sequentially operable in synchronism, means for varying the sequence of operation of said tubes at said transmitting and receiving stations in synchronism, said last means comprising a similar secret record, and an image scanning tube, having a target electrode, adapted to produce electrostatic charges on elemental areas thereof proportional to incident light at each of said stations, means for focusing said record on said target at each of said stations to produce electrical currents, and means for varying the potential of said points by said electrical currents to vary said sequence of operation.

8. In a multiplex signaling system, a transmitting station, a receiving station, an electronic commutator at each of said stations, said commutator comprising a plurality of unit vacuum tubes each of said tubes being conductive to a different magnitude of a source of varying voltage, said source comprising, a resistance, a vacuum tube having an anode, a cathode, and a grid, said resistance being connected in the common circuit of said anode and said grid, a source of anode current in the circuit of said anode, said anode circuit being substantially free from impedance other than said resistance, means for varying the potential of said grid, said last means comprising a gas discharge device, in parallel with a condenser, in series with a resistance, and means for rendering said gas discharge device at each of said stations conductive simultaneously.

9. A multiplex signaling electronic commutator comprising: a plurality of unit vacuum tubes each of said vacuum tubes having an anode, a cathode, and a plurality of grids, means for generating a varying voltage, means for rendering each of said tubes conductive at different magnitudes of said voltage, said last means comprising means for applying said voltage to said grids to tend to produce a positive potential on a first of said grids of each of said tubes, and a negative potential on a second of said grids of each of said tubes, said means for applying said voltage to said second of said grids comprising a separate resistance common to the circuit of said anode and said grids of each of said tubes, and means for impressing signal energy on the anode circuit of each of said tubes, said means for generating said varying voltage, comprising a second resistance, a high transconductance triode, having a plate, filament, and control electrode, said second resistance being connected in the common plate and control electrode circuit of said triode, the circuit of said plate being substantially free from impedance other than said second resistance, and means for cyclically varying the potential of said control electrode.

10. In a multiplex signaling system, a transmitting station, a receiving station, an electronic commutator at each of said stations, said commutator comprising unit tubes sequentially operable at different magnitudes of a varying voltage, means for generating said varying voltage for one of said commutators, said means comprising a gas discharge device, a condenser in parallel with said device, a source of voltage and a load in series with said device, said load comprising, a vacuum tube having an anode, a cathode and a grid, a resistance connected in the common circuit of said anode and grid, means for impressing a positive potential on said grid to counteract the steady negative potential impressed thereon by said resistance, said last mentioned means comprising a photoelectric cell connecting said anode and said grid, a second resistance connecting said grid and the negative terminal of said first resistance, and means for illuminating said cell.

11. In a multiplex signaling system, a transmitting station, a receiving station, an electronic commutator at each of said stations, said commutator comprising a plurality of unit vacuum tubes, one of said tubes having a plate, filament and a plurality of grids, a resistance common to the circuit of said plate and grids, means for generating a variable current, means for applying said current to a first of said grids to tend to produce a positive potential on said first grid, a source of voltage, means for connecting said resistance and a second of said grids to points of predetermined potential on said source of voltage, said last means comprising a second resistance, a high transconductance triode having an anode, a cathode, and a control electrode, said second resistance being connected in the anode and control electrode circuit of said triode, said anode being connected to the positive terminal of said source of voltage, said first mentioned resistance, and a second of said grids, being connected to points on said second resistance, a secret record at each of said stations and means for varying the potential on said control electrode with said secret record to vary the instant of operability of corresponding transmitting and receiving tubes in synchronism.

12. In a sequence multi-channeled signaling system with a transmitting and receiving station, means for shifting the sequence of operability of said channels, said means comprising a similar record at each of said stations, said record having a line thereon corresponding to each of said channels, means for successively scanning said record in a direction perpendicular to said lines, an electronic commutator having a different unit vacuum tube rendered conductive to electrical current by each of said lines, means for rectifying said current in each of said unit vacuum tubes, and means for controlling the sequence of operability of said channels with rectified currents of said unit vacuum tubes.

13. The combination of a plurality of electronic commutators, each of said commutators comprising a plurality of commutator unit vacuum tubes, each of said vacuum tubes having an anode, a cathode, and a plurality of grids, a separate resistance connected in the common circuits of said anode and said grids of each of said tubes, a source of voltage connected in the circuit of said anode, means for maintaining synchronism between said commutators, said means comprising means for successively rendering one of said grids in each of said tubes positive to permit anode space current to flow in said tube until the grid current flowing from said one of said grids through said separate resistance impresses a negative potential on a second of said grids.

14. A multiplex signaling electronic commutator comprising: a plurality of unit vacuum tubes each of said vacuum tubes having an anode, a cathode, and a plurality of grids, means for generating a varying voltage, means for rendering each of said tubes conductive at different magnitudes of said voltage, said last means comprising means for applying said voltage to said grids to tend to produce a positive potential on a first of said grids in each of said tubes and a negative potential on a second of said grids of each of said tubes, said means for applying said voltage to said second of said grids comprising a separate resistance common to the circuit of said anode and said grids of each of said tubes, and means for producing a voltage drop across said separate resistance by grid current flowing from said first of said grids, in each of said tubes.

15. A multiplex signaling system comprising: a transmitting station, a receiving station, lines connecting said stations, an electronic commutator at each of said stations, said commutator comprising a plurality of unit vacuum tubes having an anode, a cathode and a plurality of control electrodes, means for generating a varying voltage, means for rendering each of said tubes conductive at different magnitudes of said voltage, said last means comprising means for applying said voltage to said control electrodes to tend to produce a positive potential on a first of said control electrodes, and a negative potential on a second of said control electrodes, said means for applying said voltage to said second of said control electrodes comprising a separate resistance common to the circuit of said anode and said control electrodes of each of said tubes, said means for generating said varying voltage comprising a second resistance, a vacuum tube having a plate, filament, and grid, said second resistance being connected in the common plate and grid circuit of said last vacuum tube, the circuit of said plate being substantially free from impedance other than said resistance, means for cyclically varying the potential of said grid, said last mentioned means comprising a gas discharge device, a condenser in parallel with said device, a source of voltage and a load in series with said device, said load comprising a triode, having a plate, filament and grid, a third resistance connected in the common circuit of said plate and said grid of said triode, means for impressing a positive potential on said grid of said triode to counteract the steady negative potential impressed thereon by said third resistance, said last means comprising a photoelectric cell connecting said plate and said grid of said triode, a fourth resistance connecting said grid of said triode and the negative terminal of said third resistance, means for illuminating said cell, means for producing pulses at said transmitting station to maintain said varying voltage at said transmitting and said receiving stations in synchronism, said means for producing pulses comprising a thermionic tube having an input and an output circuit, a resistance shunted by a condenser connected in said input and said output circuit of said thermionic tube, the primary of a transformer connected in said output circuit, means for connecting the secondary of said transformer across said lines, means for applying positive voltage surges from said source of varying voltage at said transmitting station to said input circuit of said thermionic tube, to produce pulses of current in said output circuit, means for synchronously varying the sequence of operability of said unit vacuum tubes of said commutators at each of said stations, said last mentioned means comprising a similar record, a mosaic electrode upon which electrostatic charges are adapted to accumulate at each of said stations, means for focusing said record on said electrode, means for synchronously scanning said electrode at each of said stations to produce a current varying with said electrostatic charges at each of said stations, and means for producing identical changes in said sequence with said currents produced at each of said stations.

16. In a signaling system, a transmitting station, a receiving station, an electronic commutator at each of said stations, said commutator comprising a plurality of unit vacuum tubes, each having an anode, a cathode and a control electrode, a separate resistance connected in the common anode, control electrode of each of said tubes, means for producing a synchronizing current, means for applying said current to a first of said control electrodes in each of said tubes to tend to produce a positive potential on said first of said control electrodes, and a negative potential on a second of said control electrodes, said means for producing said negative potential on said second of said control electrodes comprising said resistance, a source of voltage, means for connecting said resistance and said second of said control electrodes of each of said tubes to points of different potential on said source of voltage, said means for producing said synchronizing current comprising a second resistance, a triode having an input and output circuit, means for connecting said second resistance in said input and said output circuit, said output circuit being substantially free from impedance other than said second resistance, means for impressing a varying potential on said input circuit, said last means comprising a grid controlled gas discharge device, a condenser in parallel with said device, a load in series with said device, said load comprising a thermionic vacuum tube having a plate, filament, and grid, a third resistance connected in the plate and grid circuit of said thermionic tube, a photoelectric cell connecting said plate and said grid, a fourth resistance connecting said grid and the negative terminal of said third resistance, means for illuminating said cell to produce a steady positive potential across said fourth resistance to counteract the excessive negative potential impressed on said grid by said current flowing through said third resistance, means for producing pulses to maintain synchronism between said synchronizing current at said transmitting and said receiving stations, said means for producing said pulses comprising a pulse generating vacuum tube having an input and an output circuit, a resistance shunted by a condenser connected in said input and said output circuit of said pulse generating tube, the primary of a transformer connected in the output circuit of said pulse generating tube, means for applying pulses across the secondary of said transformer to the grid of said gas discharge device to control the instant of discharge of said condenser in parallel with said device, means for applying positive surges of current to the input circuit of said pulse generating tube, means for varying the sequence of operability of said unit vacuum tubes at both of said stations to a new sequence, said last means comprising similar records at each of said stations, means for synchronously scanning said records to produce electrical currents corresponding in magnitude to light emitted by elemental areas of said records being scanned, said scanning means involving no moving parts, and means for varying said sequence by said electrical currents.

OLIVER T. FRANCIS.